Patented Mar. 27, 1951

2,546,748

UNITED STATES PATENT OFFICE 2,546,748

AGENTS FOR COLORING EMULSIONS AND DISPERSIONS, ESPECIALLY THOSE OF THE OIL IN WATER TYPE

Anders Herlöw, Grindsted, Denmark, assignor to A/S Grindstedvaerket, Grindsted, Denmark No Drawing. Application May 6, 1947, Serial No. 746,308. In Denmark June 2, 1942

Section 1, Public Law 690, August 8, 1946
Patent expires June 2, 1962

5 Claims. (Cl. 99—148)

Ordinary butter color which as known consists of a solution of a fat soluble coloring matter in a liquid fat—especially a solution of arnotto in rape seed oil or in mixtures of rape seed oil and soy bean oil or linseed oil—and similar coloring matters are not well suited for coloring emulsions of the oil in water type unless the coloring is done by dissolving the coloring matter in the fat phase of the emulsion before the emulsion is formed. This method, however, cannot be used for coloring emulsions already formed by nature, as e. g. milk, and involves furthermore the inconvenience that an additional coloring of emulsions which for some reason or other have been too lightly colored, is not possible.

Emulsions of the oil in water type can certainly be colored by water soluble coloring matters which can be added before as well as after the emulsifying process, the coloring matter being in all cases easily distributed in the aqueous phase. In many cases, however, it is for various reasons specially desired to use fat soluble coloring matters.

In some cases such coloring matters have been used by dissolving the coloring matter in a small amount of oil so that a solution having the character of butter color is obtained, which solution thereafter is mixed with the finished emulsion or dispersion. There is, however, usually obtained a bad and heterogeneous coloring effect only the product presenting spots and streaks of the coloring matter solution used, since said solution will not allow itself to be finely enough distributed throughout the finished emulsion.

The present invention first of all relates to agents for coloring emulsions or dispersions especially of the oil in water type, by the use of which said drawbacks are avoided. This coloring matter however can also be used for coloring emulsions and dispersions of the water in oil type, it being thereby used in the same manner as known coloring matter for this purpose.

The agent according to the present invention is of the kind that consists of a solution of a fat-soluble coloring matter in an oily or fatty solvent but the agent is specifically characterized in that the solvent consists entirely or partly of an emulsifying or dispersing agent. Particularly advantageous are emulsifying or dispersing agents for emulsions or dispersions of the oil in water type but in certain cases emulsifying agents can be used which are able to support the formation of the opposite system which of course is resorted to when the coloring matter has to be used in connection with water in oil systems.

As example of the use of such agents according to the invention there may be mentioned the coloring of ice cream, cheese, milk or cream, with yellow or red fat-soluble coloring matters as natural coloring matters, e. g. arnotto, or the coloring of boot or leather polish of the oil in water type with fat-soluble aniline dyes.

The invention has a special significance in that it is possible by means of emulsifying agents for oil in water systems to produce solutions of exceptional concentration of certain fat-soluble coloring matters. It has thus turned out that the partial esters of higher fatty acids with glycerol, diglycerol or polyglycerol are particularly good solvents for carotenes and carotenoids and that it is possible to produce with these solvents solutions of arnotto 3 to 4 times as concentrated as the strongest solutions of this coloring matter in oil, which are stable at room temperature.

As a solvent the most varied fat-like or oil-like emulsifying agents can be used, especially those suitable for the production of emulsions or dispersions of the oil in water type. Then besides the above mentioned the corresponding partial esters of glycol, diglycol and polyglycol can be mentioned. In the fatty acid chains hydrophilic groups may have been introduced, e. g. by sulphonating or by oxidation or polymerisation or both oxidation and polymerisation at possible double bonds. Also phosphoric acid groups or phosphoric acid groups may have been introduced or emulsifying agents of a kind entirely different from the partial fatty acid esters, may be used, e. g. lecithin or cholesterin. Even mixtures of different emulsifying agents may be used, e. g. mixtures of partial fatty acid esters with soap or mutual mixtures of partial fatty acid esters or mixtures of these with other esters than fatty acid esters or with oxidized or polymerised oil or oil that has been oxidized as well as polymerised.

The emulsifying agent or the mixture of emulsifying agents can be used in solution in a fat that can be liquid or solid just as the emulsifying agents themselves can be liquid or solid. By using for the coloring matter a solvent solid at room temperature, it is possible to ensure that said coloring matter is protected against possible undesirable influence by the oxygen of the atmosphere and by light, the solid state of the solution preventing other portions of the solution from being subjected to influence of air and light.

The invention also relates to a special method of producing the new agents when these contain natural fat-soluble coloring matters, said method being characterized in that the very solvent which consists entirely or partly of an emulsifying agent for emulsions or dispersions of the oil in water type, is used as agent of extraction when extracting the coloring matter of the raw material. It is thus in many cases possible to obtain more concentrated solutions of coloring matter than hitherto possible.

By the new agents for coloring it is possible to obtain completely uniform coloring effects even in oil in water emulsions and even if the coloring matter is not added until after the preparation of the finished emulsion. Besides, special advantages are in many cases obtained as a consequence of the coloring matter being present in the emulsion together with emulsifying agents which are active also as wetting agents which involves a better distribution and higher penetrability of the coloring matter when using the emulsion for the treatment of wet or moist products. This is of importance e. g. in connection with leather or boot polish.

When an emulsifying or dispersing agent that has a pronounced ability for promoting the formation of oil in water emulsions or dispersions is used with the coloring matter, it may happen that such coloring matter is unsuited for coloring water in oil emulsions or dispersions, by causing change of phases therein. For coloring matters that have to be used for systems of both said types, solvents are most adequately used which are balanced so that they may give emulsions of both types. Such emulsifying agents are equally well fitted for the production of the coloring matter as emulsifying agents that are able to give oil in water emulsions only.

In the following the invention shall be illustrated by some examples. It is, however, to be understood that the scope of the invention is not limited thereby.

*Example 1*

1 part of a concentrated oily solution of a fat-soluble aniline dye is mixed with 1 part of Turkey-red oil. The agent can be used for coloring leather polish of the oil in water type.

*Example 2*

1 part of a solution of carotene in peanut-oil, the strength of which is equal to 10,000 I. U. provitamin A, is mixed with 3 parts of a dispersing agent consisting of equal parts monopalmitic acid diglycerol.

The mixture is well adapted as coloring matter for ice cream or cheese, being easily dispersed in hot water, milk or cream which can be mixed with the ice-cream mixture or cheese milk.

In Example 2 the dispersing agent also may consist of monostearic acid glycerol with a small content of soap or it may consist of other partial esters of higher fatty acids and polyvalent alcohols or derivatives thereof if these are able to produce emulsions of the oil in water type, or the dispersing agent may consist in lecithin or lecithin-like products.

*Example 3*

Finely divided fresh carrot pulp is extracted in a vacuum at raised temperature with a mixture of monoglycerol esters and partial polyglycerol esters prepared from ox tallow or fully hardened ox tallow, glycerol and polyglycerol, until the solution has reached a strength of carotene equal to 2000 I. U. provitamin A.

During the extraction the water evaporates and after the extraction is finished the solution is filtered at about 70° C. and molded into blocks.

*Example 4*

A concentrated solution of arnotto can be produced in a similar manner by extracting arnotto seeds or the arnotto itself can first be separated in the usual manner from the seeds and then be dissolved in the dispersing agent.

What I claim is:

1. An oil-in-water dispersion carrying a coloring agent comprising a solution of a fat soluble coloring matter in an oleaginous solvent comprising a substantial amount of a partial ester of a fatty acid with an alcohol having more than one alcohol group of which at least one is left unesterified, and in which the dispersion is a food product.

2. An oil-in-water dispersion carrying a coloring agent comprising a solution of a fat soluble coloring matter in an oleaginous solvent comprising a substantial amount of a partial ester of a fatty acid with an alcohol having more than one alcohol group of which at least one is left unesterified, and in which the dispersion is an ice cream mix.

3. An oil-in-water dispersion carrying a coloring agent comprising a solution of a fat soluble coloring matter in an oleaginous solvent comprising a substantial amount of a partial ester of a fatty acid with an alcohol having more than one alcohol group of which at least one is left unesterified, and in which the dispersion is a milk product.

4. An oil-in-water dispersion carrying a coloring agent comprising a solution of a fat soluble coloring matter in an oleaginous solvent comprising a substantial amount of a partial ester of a fatty acid with an alcohol having more than one alcohol group of which at least one is left unesterified, and in which the dispersion is a food product and the partial ester is monopalmitic acid diglycerol.

5. An oil-in-water dispersion carrying a coloring agent comprising a solution of a fat soluble coloring matter in an oleaginous solvent comprising a substantial amount of a partial ester of a fatty acid with an alcohol having more than one alcohol group of which at least one is left unesterified, and in which the dispersion is a milk product and the partial ester is monopalmitic acid diglycerol.

ANDERS HERLÖW.

REFERENCES CITED

The following references are of record in the file of this patent:

UNITED STATES PATENTS

| Number | Name | Date |
|---|---|---|
| 1,953,438 | Schlack | Apr. 3, 1934 |
| 2,062,903 | Handy | Dec. 1, 1936 |
| 2,232,401 | Newton et al. | Feb. 18, 1941 |
| 2,285,422 | Epstein et al. | June 9, 1942 |